US011180686B2

(12) United States Patent
Zhou et al.

(10) Patent No.: US 11,180,686 B2
(45) Date of Patent: Nov. 23, 2021

(54) ACCELERATE CURE OF MOISTURE CURABLE POLYURETHANE ADHESIVE COMPOSITIONS USEFUL FOR BONDING GLASS

(71) Applicant: DDP Specialty Electronic Materials US, LLC, Wilmington, DE (US)

(72) Inventors: Lirong Zhou, Rochester Hills, MI (US); Daniel P. Sophiea, Lake Orion, MI (US)

(73) Assignee: DDP Specialty Electronic Materials US, LLC, Wilmington, DE (US)

( * ) Notice: Subject to any disclaimer, the term of this patent is extended or adjusted under 35 U.S.C. 154(b) by 256 days.

(21) Appl. No.: 16/441,914

(22) Filed: Jun. 14, 2019

(65) Prior Publication Data

US 2019/0309198 A1 Oct. 10, 2019

Related U.S. Application Data

(63) Continuation of application No. 15/116,323, filed as application No. PCT/US2015/026975 on Apr. 22, 2015, now abandoned.

(60) Provisional application No. 61/990,136, filed on May 8, 2014.

(51) Int. Cl.
*C09J 175/08* (2006.01)
*C08G 18/76* (2006.01)
*C08G 18/12* (2006.01)
*C08G 18/48* (2006.01)
*C08G 18/30* (2006.01)
*C08G 18/63* (2006.01)
*C08G 18/24* (2006.01)
*C08G 18/50* (2006.01)
*C08G 18/20* (2006.01)
*C08G 18/73* (2006.01)
*C09J 5/00* (2006.01)
C08K 5/12 (2006.01)

(52) U.S. Cl.
CPC ............ *C09J 175/08* (2013.01); *C08G 18/12* (2013.01); *C08G 18/2027* (2013.01); *C08G 18/2063* (2013.01); *C08G 18/244* (2013.01); *C08G 18/307* (2013.01); *C08G 18/4804* (2013.01); *C08G 18/4812* (2013.01); *C08G 18/4825* (2013.01); *C08G 18/4829* (2013.01); *C08G 18/5024* (2013.01); *C08G 18/632* (2013.01); *C08G 18/73* (2013.01); *C08G 18/7671* (2013.01); *C09J 5/00* (2013.01); C08K 5/12 (2013.01); C09J 2475/00 (2013.01)

(58) Field of Classification Search
CPC .............. C08G 18/4804; C08G 18/482; C08G 18/5021
See application file for complete search history.

(56) References Cited

U.S. PATENT DOCUMENTS

| | | | |
|---|---|---|---|
| 3,256,281 A * | 6/1966 | Kaiser ............... | C08G 18/5021 544/196 |
| 3,707,521 A | 12/1972 | De Santis | |
| 3,779,794 A | 12/1973 | De Santis | |
| 4,374,237 A | 2/1983 | Berger et al. | |
| 4,525,511 A | 6/1985 | Kirby et al. | |
| 4,542,049 A | 9/1985 | Tolhurst | |
| 4,643,794 A | 2/1987 | Saracsan et al. | |
| 4,687,533 A | 8/1987 | Rizk et al. | |
| 4,780,520 A | 10/1988 | Rizk et al. | |
| 5,063,269 A | 11/1991 | Hung | |
| 5,603,798 A | 2/1997 | Bhat | |
| 5,623,044 A | 4/1997 | Chiao | |
| 5,852,103 A | 12/1998 | Bhat | |
| 5,922,809 A | 7/1999 | Bhat et al. | |
| 5,976,305 A | 11/1999 | Bhat et al. | |
| 6,015,475 A | 1/2000 | Hsieh et al. | |
| 6,313,207 B1 | 11/2001 | Macfarland | |
| 6,368,714 B1 | 4/2002 | Robertson | |
| 6,423,755 B1 | 7/2002 | Allen | |
| 6,512,033 B1 | 1/2003 | Wu | |
| 6,613,816 B2 | 9/2003 | Mahdi et al. | |
| 6,657,035 B1 | 12/2003 | Nakata et al. | |
| 6,709,539 B2 | 3/2004 | Zhou | |
| 6,828,403 B2 | 12/2004 | Mahdi et al. | |
| 7,071,370 B2 | 7/2006 | Harris et al. | |
| 7,101,950 B2 | 9/2006 | Zhou et al. | |
| 7,226,523 B2 | 6/2007 | Rosenberg et al. | |
| 7,253,244 B2 | 8/2007 | Gruenewaelder et al. | |
| 7,361,292 B2 | 4/2008 | Zhou | |
| 8,236,891 B2 | 8/2012 | Golombowski et al. | |
| 8,378,019 B2 | 2/2013 | Juul | |
| 8,729,168 B2 | 5/2014 | Jialanella et al. | |

(Continued)

FOREIGN PATENT DOCUMENTS

| | | | |
|---|---|---|---|
| CA | 2564992 A | 11/2005 | |
| CN | 1564849 A | 1/2005 | |

(Continued)

OTHER PUBLICATIONS

Chinese Office Action, CN Application No. 201580021258.2 dated Oct. 8, 2018.

(Continued)

*Primary Examiner* — Michael M Dollinger
(74) *Attorney, Agent, or Firm* — Hong Xu

(57) ABSTRACT

The adhesive system of the invention is especially useful in bonding replacement windows into vehicles. They allow for sufficient working time while still realizing a fast drive away time. The adhesive system is comprised of a moisture curable adhesive and a cure accelerator that may be applied using a simple single caulk gun and may be applied at ambient temperatures such as −10° C. and about 45° C. The cure accelerator is comprised of a polyol having a backbone that has at least one amine in the backbone. The moisture curable adhesive typically is comprised of an isocyanate terminated prepolymer.

16 Claims, No Drawings

(56) References Cited

U.S. PATENT DOCUMENTS

| | | | |
|---|---|---|---|
| 8,822,626 | B2 | 9/2014 | Vyakaranam et al. |
| 2002/0000103 | A1 | 1/2002 | Johnston |
| 2003/0018096 | A1 | 1/2003 | Lekovic et al. |
| 2003/0153671 | A1 | 8/2003 | Kaszubski et al. |
| 2004/0102535 | A1* | 5/2004 | Casati ............ C08G 18/5021 521/155 |
| 2004/0238116 | A1 | 12/2004 | Inoue et al. |
| 2004/0242832 | A1* | 12/2004 | Casati ............ C08G 18/2875 528/44 |
| 2005/0032972 | A1 | 2/2005 | Gruenewaelder et al. |
| 2006/0052522 | A1 | 3/2006 | Burckhardt et al. |
| 2007/0043196 | A1 | 2/2007 | Teysseire |
| 2007/0129451 | A1 | 6/2007 | Niemann |
| 2007/0129522 | A1 | 6/2007 | Burckhardt et al. |
| 2008/0185098 | A1 | 8/2008 | Wu et al. |
| 2010/0108260 | A1 | 5/2010 | Rasche et al. |
| 2011/0004241 | A1* | 1/2011 | Wintermantel ....... A61L 24/046 606/214 |
| 2011/0009515 | A1* | 1/2011 | Casati ................ C08G 18/36 521/170 |
| 2011/0277915 | A1 | 11/2011 | Langezaal et al. |
| 2013/0096274 | A1 | 4/2013 | Vyakaranam et al. |
| 2013/0233488 | A1 | 9/2013 | Jialanella et al. |
| 2013/0298469 | A1 | 11/2013 | Recker et al. |

FOREIGN PATENT DOCUMENTS

| | | |
|---|---|---|
| CN | 1633489 A | 6/2005 |
| CN | 1829755 A | 9/2006 |
| CN | 103080173 A | 5/2013 |
| GB | 1590818 A | 6/1981 |
| JP | H11-335436 A | 12/1992 |
| JP | 2005-506397 A | 3/2005 |
| JP | 2003-528184 A | 6/2005 |
| JP | 2003-171643 A | 5/2013 |
| JP | 2014/507506 A | 3/2014 |
| WO | 95/10555 A | 4/1995 |
| WO | 1997/025360 A1 | 7/1997 |
| WO | 00/44848 A1 | 8/2000 |
| WO | 2002/01236 A1 | 6/2002 |
| WO | 2002/092714 A1 | 11/2002 |
| WO | 2005/019292 A1 | 3/2005 |
| WO | 2012/151085 A1 | 11/2012 |

OTHER PUBLICATIONS

Japanese Office Action, CN Application No. 2016-563994 dated Feb. 5, 2019.
BASF, Safety Datya Sheet Pluracol 355 Polyol. (Year: 2015).
Dow Plastics Product Information. Voranol 391 MSDS. (Year: 2001).
Dow Product Safety Assessment. Propoxylated/ethoxylated ethylenediamine polyol. Revised Jun. 26, 2014. Accessed Dec. 22, 2017. Available at http://msdssearch.dow.com/PublishedLiteratureDOWCOM/dh_096d/0901b803 8096db68.pdf?filepath=productsafety/ pdfs/noreg/233-00362.pdf&fromPage_GetDoc. (Year: 2014).
Translation of Japanese Office Action, JP Application No. 2016-563994 dated May 21, 2019.
International Preliminary Report on Patentability, PCT Application No. PCT/US2015/026975 dated Nov. 8, 2016.

\* cited by examiner

ACCELERATE CURE OF MOISTURE CURABLE POLYURETHANE ADHESIVE COMPOSITIONS USEFUL FOR BONDING GLASS

FIELD OF INVENTION

The invention relates to moisture curable adhesive compositions. In particular, the invention relates to moisture curable isocyanate terminated prepolymer adhesive compositions coupled with a separate cure accelerator useful to bond glass into vehicles and buildings.

BACKGROUND OF INVENTION

One-part moisture curing adhesive compositions have been used to bond windows into buildings and vehicles. Examples of adhesives useful for these applications are described in U.S. Pat. Nos. 4,374,237; 4,687,533; 4,780,520; 5,063,269; 5,623,044; 5,603,798; 5,922,809; 6,015,475; 6,512,033; 6,657,035; 6,709,539; 7,101, 950; 7,226,523; 7,361,292; 8,236,891 and CA 2,564,992. In automobile factories windows are installed using robots and computer controlled processing which facilitates the use of a variety of high performance adhesives, for instance, nonconductive adhesives and high modulus adhesives. The speed of cure is not a significant issue because new vehicles are not driven any significant distance for several days after window installation.

In contrast, when a vehicle needs a window replaced, it is often driven shortly after. The replacement is often performed in a remote location by an installer working from a vehicle or otherwise under uncontrolled conditions. Consequently, speed of cure is important as the vehicle owner desires to drive the vehicle as soon as possible after installation of the window. One-part moisture curing adhesives useful in replacing windows for vehicles which facilitate fast drive away times have been described in U.S. Pat. Nos. 5,976,305; 6,709,539 and 7,226,523. Even though these adhesives have built up enough integrity to be driven away in a short time, they still have required much longer times to fully cure and inconsistently cured depending on the ambient conditions such as temperature and relative humidity.

Two-part compositions containing isocyanate functional compounds or prepolymers in one part and compounds and/or prepolymers having isocyanate reactive components have also been used. It is understood that the two parts commonly referred to as the A and B side have essentially the same volume. Examples of two-part compositions containing isocyanate functional compounds or prepolymers in one part and compounds and/or prepolymers having isocyanate reactive components in the other part are disclosed in EP 1,524,282, and U.S. Pat. Nos. 5,852,103; 6,709,539; 7,101,950 and 7,361,292. These tend to suffer, however, from complex delivery systems, to keep the two parts separate as well as requiring sufficient mixing when dispensing to realize a uniform product. Likewise, two-part adhesive compositions tend to react quickly and may form skins resulting in insufficient working time to allow proper positioning of the replacement window under certain conditions (higher temperatures and higher relative humidity). Thus, even though a two-part composition may allow automobiles with replacement windows to be driven within 30 minutes of bonding the window into the automobile, they have not in general allowed any quicker drive away times and care must be taken to ensure a uniform adhesive bead.

More recently, a two-part dual cure adhesive composition comprised of isocyanate terminated prepolymers in one part and an acrylic acrylate monomer in the other part has been described in WO 2012/151085. In this composition one part contains an isocyanate terminated polyether prepolymer and the other part contains a hydroperoxide compound and acrylic or acrylate monomer, where the hydroperoxide compound is reduced upon mixing with the other part forming free radicals to realize sufficient integrity from the development of an initial polyacrylic or polyacrylate matrix to allow relatively fast drive away times. However, the working time, consistency of the bead, workability, ultimate cure properties were less than desirable.

Thus, it would be desirable to have a rapid drive away adhesive for bonding glass into a structure that cures sufficiently to allow for driving away in a short amount of time such as even 15 minutes while also providing for consistent uniform adhesive beads and sufficient workability (time where the glass may be placed and manipulated and still have adequate adhesion) under varying ambient conditions.

SUMMARY OF INVENTION

A first aspect of the invention is a method of accelerating the cure of an adhesive composition comprising:
  a) providing a moisture curable adhesive composition comprised of an isocyanate terminated prepolymer and a cure accelerator comprised of a polyol having a backbone comprised of at least one amino group, wherein the moisture curable adhesive and cure accelerator are separately provided;
  b) mixing the cure accelerator and the adhesive composition to form an adhesive mixture;
  c) applying the adhesive mixture to at least a portion of a first substrate;
  d) contacting the substrate having the adhesive mixture thereon with a second substrate such that the adhesive mixture is therebetween; and
  e) allowing the adhesive mixture to cure bonding said substrates together.

It has been discovered that a cure accelerator for a moisture curable adhesive composition comprised of an isocyanate terminated prepolymer may be cured in substantially less time while still having sufficient working time and final cured properties desired for installing aftermarket glass when repairing chipped or broken glass in vehicles. Illustratively, the adhesive mixture may have a working time on the order of 5, 8 or even 10 minutes, while being essentially cured in 60 minutes. Likewise, the method also allows for consistent application of these moisture curable adhesives under widely different ambient conditions.

In another aspect the invention is an adhesive system comprised of a moisture curable adhesive comprised of an isocyanate terminated prepolymer and a separate cure accelerator comprised of a polyol having a backbone comprised of at least one amino group.

The adhesive system of the invention may be used to bond a variety of substrates together. Examples of substrates include plastic, glass, wood, ceramics, metal, and coated substrates, such as plastics coated with an abrasion resistant coating. The adhesive system of the invention may be used to bond similar and dissimilar substrates together. The adhesives are especially useful for bonding glass or a plastic with an abrasion resistant coating disposed thereon to other substrates such as vehicles (e.g., automobiles) and buildings. The compositions of the invention are also useful in bonding parts of modular components together, such as vehicle modular components. The glass or plastic coated with an abrasion resistant coating may be bonded to coated and uncoated portions of vehicles.

The compositions of the invention are especially useful in bonding replacement windows into structures. The adhesive is pumpable, sag resistant and bonds parts together at temperatures between about −10° C. and about 45° C. Preferably, the composition has a sag of an uncured sample of less than about 2 mm and decking force of between about 1.5 pounds and about 15 pounds under typical ambient conditions (i.e., temperatures of about −10° C. to about 35° C. and relative humidities of 25% to 75%). This allows the adhesives prepared from the composition of the invention to be applied at a wide range of ambient temperatures. Heating the material is not necessary for the application of the adhesive. It has been surprisingly discovered that the adhesive system can offer the unique combination of realizing a suitable decking force to allow placement of the windshield shortly after application and for a sufficient time to allow repositioning coupled with a fast cure allowing for a vehicle to be driven away even after only 15 minutes. In addition, it has been discovered that the adhesion system allows for much more consistent application and performance even at the extremes of typical ambient conditions.

DETAILED DESCRIPTION OF INVENTION

"Nominal" as used with respect to functionality means the theoretical functionality, generally this can be calculated from the stoichiometry of the ingredients used. Generally, the actual functionality is different due to imperfections in raw material, incomplete conversion of the reactants and formation of bi-products.

The isocyanate terminated prepolymers of the moisture curable adhesive are present in sufficient quantity to provide adhesive character to the adhesive system. Such prepolymers have an average isocyanate functionality sufficient to allow the preparation of a crosslinked polyurethane upon cure and not so high that the polymers are unstable. "Stability" in this context means that the prepolymer or adhesive prepared from the prepolymer has a shelf life of at least three months at ambient temperature when not exposed to water, in that it does not demonstrate an increase in viscosity during such period which prevents its dispensing, application or use. For example, the viscosity should not rise too greatly to make it impractical to dispense the moisture curable adhesive. Preferably, the adhesive composition does not undergo an increase in viscosity of more than about 50 percent during the stated period.

The isocyanate terminated prepolymer generally has a total NCO content which facilitates acceptable strength in adhesives prepared from the prepolymers after 60 minutes and stability of the prepolymer. Total NCO content includes the NCOs from the isocyanate terminated prepolymer or unreacted isocyanates used to make the prepolymers and may include added polyisocyanate compounds described below. Preferably, the NCO content is about 0.6 percent by weight or greater based on the weight of the prepolymer and more preferably about 0.9 percent by weight or greater, and preferably about 4.0 percent by weight or less, more preferably about 3.5 or less, even more preferably about 3.0 percent by weight or less, and even more preferably about 2.6 percent by weight or less. If the prepolymer has greater than about 4.0 percent by weight, the dispensed moisture curable adhesive may demonstrate lap shear strengths after 60 minutes that may be too low for the intended use. Below about 0.6 percent by weight, the prepolymer viscosity may be too high to handle and the working time may be too short even if dispensable.

Preferable polyisocyanates for use in preparing the prepolymer include those disclosed in U.S. Pat. No. 5,922,809 at col. 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols.

The prepolymers are made from polyols such as diols and triols such as those described in U.S. Pat. No. 5,922,809 at column 4, line 60 to column 5, line 50. The polyols (diols and triols) are preferably polyether polyols and more preferably polyoxyalkylene oxide polyols. The most preferred triols are ethylene oxide-capped polyols prepared by reacting glycerin with propylene oxide, followed by reacting the product with ethylene oxide.

Preferably, the polyether is chosen to decrease the polarity of the prepolymer. A significant factor in determining the polarity of the prepolymer is the amount of ethylene oxide units in the polyether used to prepare the prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the polyether prepolymer such as a polyester polyol such as those known in the art. Typically, such other polyols may be present in an amount of about up to 5% by weight of the polyols used to make said prepolymer. However, said prepolymer may be made in the absence of such polyols.

The isocyanate terminated prepolymers may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. "Isocyanate content" means the weight percentage of isocyanate moieties to the total weight of the prepolymer. The reactions to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate. Preferably, the reaction is carried out in admixture with a plasticizer further described below.

The moisture curable adhesive generally is also comprised of a filler such as a carbon black. The carbon blacks depending on their structure and the molecular weight of the prepolymers may range over a wide range of structures as given by oil absorption number (ASTM D-2414-09). For example, the carbon black typically desirably has an oil absorption number (OAN) of about 80 to 200 ccs per 100 grams. Preferably, the oil absorption of the carbon is at least about 90, more preferably at least about 100, and most preferably at least about 110 to preferably at most about 180, more preferably at most about 165 and most preferably at most about 150 ccs/100 grams.

The amount of carbon black suitable may be determined for a given carbon black. Typically, the amount of carbon black is at least in ascending desirability, 10%, 15%, to at most, in ascending desirability, 38%, 35%, 32%, 30% or 28% by weight of the adhesive composition.

The carbon black used may be a standard carbon black which is not specially treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include RAVEN™ 790, RAVEN™ 450, RAVEN™ 500, RAVEN™ 430, RAVEN™ 420 and RAVEN™ 410 carbon blacks available from Colombian and CSX carbon blacks such as ELFTEX S5100 and S7100 and MONARCH 120, 570, and 590 available from Cabot, and PRINTEX™ 30 carbon black available from Evonik Industries, Mobile, Ala. Suitable non-conductive carbon blacks include RAVEN™ 1040 and RAVEN™ 1060 carbon black available from Colombian Chemicals Company, Marietta, Ga.

The moisture curable adhesive may also be comprised of reactive silicon. The reactive silicon may be present as a separate molecule such as a silane. It may be present within the backbone or as a terminal group in the prepolymer described above. The reactive silicon, generally is one that can undergo hydrolysis such as described at column 4, lines 25-55 of U.S. Pat. No. 6,613,816. Other illustrative reactive silicons are described in U.S. Patent Publication 2002/0100550 paragraphs 0055 to 0065 and Hsieh, U.S. Pat. No. 6,015,475, column 5, line 27 to column 6, line 41.

The amount of reactive silicon, when present in the moisture curable adhesive is, generally, about 0.001% to 2% by weight of the total weight of the adhesive composition. The amount of the reactive silicon (note, the weight of the silicon itself and does not include, for example, the organic groups appended thereto), may be at least 0.005%, 0.01%, 0.02%, 0.04%, 0.06%, 0.08% or 0.1% to at most 1.8%, 1.6%, 1.4%, 1.2%, 1%, 0.8%, 0.5% of the adhesive composition.

The moisture curable adhesive may also be comprised of one or more organic based polymers dispersed therein. Preferably, the organic based polymer is included in the prepolymer by inclusion of a dispersion triol having dispersed therein particles of an organic based polymer. Dispersion triols typically understood to have at least a portion of the particles being grafted with the polyol. The preferable dispersion triols are disclosed in Zhou, U.S. Pat. No. 6,709,539 at column 4, line 13 to column 6, line 18, incorporated herein by reference. Preferably, the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably, the triols used have a molecular weight of about 3,000 or greater, more preferably about 4,000 or greater and most preferably about 5,000 or greater. Preferably, such triol has molecular weight of about 8,000 or less and more preferably about 7,000 or less. It is understood that the polyol of the dispersion polyol (e.g., triol) is included in the polyol to make the prepolymer composition described herein, where the copolymer particles of the dispersion polyol are understood to be fillers in the composition.

The moisture curable adhesive typically is further comprised of a plasticizer. The plasticizers may be used so as to modify the rheological properties to a desired consistency. Such materials should be free of water and be inert to isocyanate groups. The plasticizers may be common plasticizers useful in polyurethane adhesive applications and well known to those skilled in the art and are referred to hereinafter as low polar plasticizers. The plasticizer is present in an amount sufficient to disperse the isocyanate terminated prepolymer. The plasticizer can be added to the prepolymer either during preparation of the prepolymer or during compounding of the prepolymer prior to being placed into the first compartment. Preferably, the plasticizer is present in about 1 percent by weight or greater of the prepolymer formulation (prepolymer plus plasticizer), more preferably about 20 percent by weight or greater and most preferably about 30 percent by weight or greater. Preferably, the plasticizer is present in about 45 percent by weight or less of the prepolymer formulation and more preferably about 35 percent by weight or less.

Preferably two plasticizers are used, with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, parraffinic oils and silicone oils. Preferred low polar plasticizers include alkyl phthalates, such as diisononyl phthalates, dioctylphthalate and dibutylphthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably, low polar plasticizers are used in an amount of about 5 parts by weight or greater based on the weight of moisture curable adhesive, more preferably about 10 parts by weight or greater, and most preferably about 18 parts by weight or greater. The low polar plasticizer is preferably used in an amount of about 40 parts by weight or less based on the total amount of moisture curable adhesive, more preferably about 30 parts by weight or less and most preferably about 25 parts by weight or less.

The amount of high polar plasticizer in the moisture curable adhesive is that amount which gives the desired rheological properties and the acceptable sag and string properties of the dispensed moisture curable adhesive. Preferably, the high polar plasticizers are used in the moisture curable adhesive in an amount of about 0.2 parts by weight or greater based on the weight of moisture curable adhesive, more preferably about 0.5 parts by weight or greater, and most preferably about 1 part by weight or greater. The high polar plasticizer is preferably used in an amount of about 20 parts by weight or less based on the total amount of the moisture curable adhesive, more preferably about 12 parts by weight or less and most preferably about 8 parts by weight or less.

The moisture curable adhesive may further comprise a polyfunctional isocyanate, for example, to improve the modulus of the composition in the cured form or adhesion of the adhesion composition to particular substrates such as painted substrates. "Polyfunctional" as used in the context of the isocyanates refers to isocyanates having a functionality of 2 or greater. The polyisocyanates can be any monomeric, oligomeric or polymeric isocyanate having a nominal functionality of about 2.5 or greater. More preferably, the polyfunctional isocyanate has a nominal functionality of about 2.7 or greater. Preferably, the polyfunctional isocyanate has a nominal functionality of about 5 or less, even more preferably about 4.5 or less and most preferably about 3.5 or less.

The polyisocyanates may be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300 and N100, and polymeric isocyanates such as polymeric MDI (methylene diphenyl diisocyanates) such as those marketed by The Dow Chemical Company under the trademark of PAPI, including PAPI 580N polymeric isocyanate. The polyfunctional isocyanates, when present are typically present in an amount sufficient to impact the modulus of the cured compositions of the invention or improve the adhesion to certain substrates described above.

The polyfunctional isocyanate, when present, is preferably present in an amount of about 0.5 parts by weight or greater based on the weight of the moisture curable adhesive, more preferably about 1.0 parts by weight or greater and most preferably about 2 parts by weight or greater. The polyfunctional isocyanate is preferably present in an amount of about 8 parts by weight or less, based on the weight of the moisture curable adhesive, more preferably about 5 parts by weight or less and most preferably about 4 parts by weight or less.

The moisture curable adhesive may also be comprised of a catalyst that catalyzes the reaction of isocyanate moieties with water or an active hydrogen containing compound. Such compounds are well known in the art. The catalyst can be any catalyst known to the skilled artisan for the reaction of isocyanate moieties with water or active hydrogen-containing compounds. Among preferred catalysts are organotin compounds, metal alkanoates, and tertiary amines. Mixtures of classes of catalysts may be used. A mixture of a tertiary amine and a metal salt is preferred. Even more preferred are tertiary amines, such as dimorpholino diethyl ether or triethylenediamine, and a metal alkanoate, such as bismuth octoate or dimethyltin dineodecanoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyltin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate.

The organotin or metal alkanoate catalyst, as percentage of the total weight of the moisture curable adhesive, is present, generally, in an amount of about 60 parts per million or greater, preferably 120 parts by million or greater to at most about 1.0 percent, preferably 0.5 percent by weight and more preferably about 0.1 percent.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)ether). Tertiary amines are preferably employed in an amount, based on the weight of the moisture curable adhesive of about 0.01 parts by weight or greater, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

The moisture curable adhesive may be formulated with fillers other than the carbon black and additives known in the prior art for use in adhesive compositions. By the addition of such materials, physical properties such as viscosity flow rates and the like can be modified. However, to prevent premature hydrolysis of the moisture sensitive groups of the isocyanate terminated prepolymer, fillers should be thoroughly dried before admixture therewith. Other exemplary fillers include clay, titanium dioxide, calcium carbonate, surface treated silica, titanium oxide, fumed silica, talc, and the like. In one embodiment, more than one reinforcing filler may be used.

The moisture curable adhesive may also have a stabilizer that inhibits and prevents premature crosslinking of the isocyanates in the adhesive. Stabilizers known to the skilled artisan for moisture curing adhesives may be used. Examples of stabilizers include diethylmalonate, alkylphenol alkylates, paratoluene sulfonic isocyanates, benzoyl chloride and orthoalkyl formates. Stabilizers are typically used in an amount of about 0.1 parts by weight or greater based on the total weight of moisture curable adhesive, preferably about 0.5 parts by weight or greater and more preferably about 0.8 parts by weight or greater. Such stabilizers are used in an amount of about 5.0 parts by weight or less based on the weight of the adhesive, more preferably about 2.0 parts by weight or less and most preferably about 1.4 parts by weight or less.

Other components commonly used in adhesive compositions may be used in the moisture curable adhesive. Such materials are well known to those skilled in the art and may include ultraviolet stabilizers, antioxidants, heat stabilizers and the like.

The moisture curable adhesive may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments where a substantial amount of polyester-based isocyanate functional prepolymer is used, the adhesive compositions may be blended at a temperature above the melting point of the polyester-based isocyanate functional prepolymer and below a temperature at which significant side reactions occur. In this embodiment, the temperatures utilized are from about 40° C. to less than about 90° C., and more preferably about 50° C. to about 70° C. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive system is also comprised of a cure accelerator comprised of a polyol having amino group in the backbone of the polyol. Said polyol has terminal OH groups and at least one amino group in the backbone of the polyol. The polyol having an amino group generally has an average OH functionality (total moles OH/total moles polyol) of greater than 2 to 5. The average OH functionality is preferably at least about 2.5, 3.0, 3.5, 3.8 to at most about 4.8, 4.5 or 4.2.

The polyol having an amino group has at least one amino group within the backbone of the polyol. The backbone may be the same as described above for polyols used to make the isocyanate terminated prepolymer (e.g., aliphatic, polyether or polyester backbones). The polyol having an amino group may be formed by initiating the formation of a polyol using a polyfunctional amine compound. Generally, the amino groups present in the backbone are essentially all tertiary amines.

The average amount of amino groups in the polyol having an amino group generally is from about 1 to 6. Preferably, the average amount of amino groups present in the polyol having an amino group is at least about 1.5, 2, 3.0, 3.5, or 3.8 to at most about 4.8, 4.5 or 4.2.

The polyol having an amino group may be any such polyol so that the desired cure and workability may be realized as further described below. It has been discovered that it is preferable that such polyol has an apparent pH of at least about 10, more preferably at least about 10.5, even more preferably at least about 11 and most preferably at least about 11.5. Apparent pH may be measured as described below in Testing and Analytical Procedures.

Likewise, the OH number (OH #) of the polyol having an amino group may be any useful to realize the desired cure rate and workability. Generally, the OH # is at least about 25 to 2000. Preferably, the OH number is at least about 100, 250, 500 or even 550. The OH number arises from a wet analytical method for the hydroxyl content of a polyol; it is the milligrams of potassium hydroxide equivalent to the hydroxyl content in one gram of polyol or other hydroxyl compound and is given by the below equation:

$$OH\ Number = \frac{56.1 \times 1000}{Equivalent\ Weight}$$

where 56.1 is the atomic weight of potassium hydroxide and 1000 is the number of milligrams in one gram of sample.

The polyol having an amino group may also have any useful molecular weight. Generally, the molecular weight of said polyol is at least about 200 to 10,000. Preferably the molecular weight is at most about 5000, 3000, 1500, 1000, 500 or even 400. Preferably the molecular weight is at least about 100, 200 or 250. In a preferred embodiment, the polyol having an amino group has an average OH functionality of 3.5 to 4.2 and OH number of at least 500.

The cure accelerator may be comprised of a small amount of water so long that it does not deleteriously affect the cure rate, workability and cured properties of the adhesive mixture arising, for example, by causing bubbling. The amount of water in the cure accelerator, generally, is less than about 1% based upon the total weight of the cure accelerator and the moisture curable adhesive. Typically, it is desirable for the amount of water to be as low as practicable such as only trace amounts such as 500 parts per million by weight of the total weight of the moisture curable adhesive and cure accelerator. Preferably, the amount of water is at most about 100 ppm to no water or essentially no water using known methods for determining water content.

The cure accelerator may contain one or more of other ingredients such as filler, a polyol not having an amino group in the backbone, a catalyst, plasticizer, rheological modifier, UV stabilizers or other useful ingredients used moisture curable adhesives. The fillers, polyols, plasticizer and catalysts may be any one of those described previously or known in the art. The amount of each of these may be determined by the desired amount of isocyanate reactive groups (e.g., OH) and other physical characteristics such as rheological properties, which may be useful to ensure uniform mixing and applying of the adhesive system.

When a filler, polyol not containing an amino group, catalyst and plasticizer are contained in the cure accelerator they will typically be present in amounts as follows. The polyol with the amino group typically will be present in an amount of 5% to 50% by weight by weight of the cure accelerator. The polyol without an amino group will typically present in an amount of 20% to 80% by weight of the cure accelerator. The filler or combination of fillers will typically be present in an amount of 10% to 35% of the cure accelerator. The catalyst or combination of catalyst will typically present in an amount of 0.01% to 2% of the cure accelerator.

The cure accelerator is used to accelerate the cure of a moisture curable adhesive. When doing so, the cure accelerator and moisture curable adhesive are provided separately, otherwise they will react prior to application. Any suitable method of providing two reactive materials having different volumes that are later mixed may be used such as those known in the art and described in application U.S. Application No. 61/977,668, filed Apr. 10, 2014 to Zhu et. al., from page 1, line 10 to page 2, line 8. Preferably, the moisture curable adhesive and cure accelerator are provided in the two component reactive dispensing system described in the aforementioned US Application.

Because the moisture curable adhesive is comprised of an isocyanate terminated prepolymer and is moisture curable, the isocyanate index of the adhesive system (i.e., the amount of isocyanates/reactive groups in the cure accelerator multiplied by 100) is generally 85 to 120, but preferably is about 90 to 115. Likewise, because of the use of a moisture curable adhesive, generally, the volume ratio of the moisture curable adhesive to cure accelerator is about 5 or 10 to 200, 100, 50 or 20. The iso index is essentially the same for all the examples and comparative examples.

The mixing, applying, contacting and allowing to cure of the moisture curable adhesive and cure accelerator may be accomplished by any suitable method such as those known in the art including those described in the aforementioned US Application. Preferably, the mixing, applying, contacting are performed using the method of the above US Application.

The adhesive system of the invention may be used to bond a variety of substrates together. The adhesive system may be used to bond porous and nonporous substrates together. The adhesive system is applied to a substrate and the adhesive on the first substrate is thereafter contacted with a second substrate. In preferred embodiments, the surfaces to which the adhesive is applied are cleaned and may be primed prior to application, but the primer is not necessary, see for example, U.S. Pat. Nos. 4,525,511; 3,707,521 and 3,779,794; for typical practices of application.

Generally, the adhesive system is applied at typical ambient conditions (23° C.±10° C.) in the presence of atmospheric moisture (typically a relative humidity of 20% to 99%). For the purposes of testing the curing behavior, an RH of 50%±5% at 23° C.±2° C. is suitable. Curing may be accelerated by the addition of additional water in the atmosphere or by applying heat during curing of the adhesive by means of convection heat, microwave heating and the like. The adhesive system generally allows an adhesive to be formulated to provide a working time (workability) of about 2 minutes to 8 minutes under ambient conditions as described above or even when there are extreme ambient conditions such as temperatures exceeding 35° C. to 45° C. or down to −10° C., while still curing sufficiently to allow drive away of a vehicle within 15 minutes of the application of the adhesive system.

The adhesive system is preferably used to bond glass or plastic coated with an abrasion resistant coating, to other substrates such as metal or plastics. In a preferred embodiment, the first substrate is a glass, or plastic coated with an abrasion resistant coating, window and the second substrate is a window frame. In another preferred embodiment, the first substrate is a glass, or plastic coated with an abrasion resistant coating, window and the second substrate is a window frame of an automobile. Preferably, the glass window is cleaned prior to bonding. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the adhesive system is used to replace windows in structures or vehicles and most preferably in vehicles. The first step is removal of the previous window. This can be achieved by cutting the bead of the adhesive holding the old window in place and then removing the old window. Thereafter, the new window is cleaned and, if desired, primed. The old adhesive that is located on the window flange can be removed, although it is not necessary and in most cases it is left in place, but may be cut flat with a cutting tool. The window flange may be primed with a paint primer, but is not necessary. The adhesive system is applied in a bead to the periphery of the window located such that it will contact the window flange when placed in the vehicle. The window with the adhesive located thereon is then placed into the flange with the adhesive located between the window and the flange. Alternatively, the adhesive may be applied to the window flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

The adhesive system is also useful for bonding large mass substrates of more than 20 Kg, up to about 120 Kg, to other substrates. In one class of large mass substrates, the substrates are large windows such as those utilized in mass transportation vehicles (e.g., buses or trains).

In certain applications, the adhesive system may be utilized with a primer or activation wipe. The primer or activation wipe is typically applied to the surface of a substrate. Any solvent is allowed to volatilize away and then the adhesive system is contacted with the substrate. Preferably, the time period from application of the primer or activation wipe to application of the adhesive system to the substrate is about 0.5 minutes or greater, more preferably about 1 minute or greater and most preferably about 2 minutes or greater.

Testing and Analytical Procedures:

To measure the workability, the decking force after 2 minutes and 8 minutes of curing is measured as follows. A triangular adhesive system bead having a height of 16 mm, length of 50 mm and base of 8 mm is dispensed through a dynamic mixer using a Betagun on to a substrate. The adhesive system bead is then compressed using an Instron at a fixed rate of 2 inches per minute with the force being recorded. The decking force, reported herein, is when the bead has a height of 6 mm.

To assess the cure, the lap shear strength is determined after varying curing times. Lap shear strength is determined by a quasi-static lap shear test at 10 mm/min according to ASTM D1002. Likewise, the cure is also assessed by measuring Shore hardness of the cured adhesive bead as follows. The Shore A hardness is determined on the fully cured bead using ASTM D 2240-05.

The apparent pH of the polyols having an amino group in the backbone is determined as follows. Ten grams of the polyol is added to 60 mL of a 10% $H_2O$ by weight in isopropyl alcohol solution and the pH of the solution is measured using a Mettler Toledo DL-58 titrator and a DG 115-SC electrode.

Illustrative Embodiments of the Invention

The following examples are provided to illustrate the invention, but are not intended to limit the scope thereof. All parts and percentages are by weight unless otherwise indicated. The raw materials used in the moisture curable adhesive and non-reactive components used in the cure accelerator are shown in Table 1. The raw materials that are reactive with isocyanate used in the cure accelerator are shown in Table 2.

TABLE 1

| Component | Description | Supplier |
| --- | --- | --- |
| Isonate 125M | 4,4'-diphenylmethane diisocyanate | The Dow Chemical Company |
| Voranol 232-036N | propylene glycol initiated polyoxypropylene based trio Mw of 4,500 | The Dow Chemical Company |
| Voranol 220-056N | propylene glycol initiated polyoxypropylene based diol Mw of 2,000 | The Dow Chemical Company |
| Palatinol N | diisononylphthalate (DINP) | BASF Corporation North America |
| Dabco T-9 | stannous octoate | Air Products and Chemicals, Inc. |
| Diethyl Malonate (DEM) | diethyl malonate (DEM) | Solvadis GmbH |
| Desmodur N100 | aliphatic polyisocyanate resin based on hexamethylene diisocyanate (HDI) | Bayer Material Science LLC |
| Dynacoll S1611 | saturated, linear copolyester in amorphous form | Evonik Degussa GmbH Coatings & Additives |
| Elftex S S7100 | carbon black | Cabot Corporation |
| Drikalite | calcium carbonate | Imersys Performance Materials |
| DMDEE | 2,2'-dimorpholinodiethylether | Huntsman Corporation |
| DABCO 33LV | 33% triethylenediamine and 67% dipropylene glycol | Air Products and Chemicals, Inc. |

Mw is weight average molecular weight

TABLE 2

| Component | Description | Supplier | OH# | Functionality | MW | Viscosity (cps) | Apparent pH |
| --- | --- | --- | --- | --- | --- | --- | --- |
| Specflex NC700 | grafted polyether polyol containing copolymerized styrene and acrylonitrile | The Dow Chemical Company | 19.5-23 | N/A | N/A | 5,500 | N/A |
| Voranol 225 | polyether polyol, 250 molecular weight triol | The Dow Chemical Company | 673 | 3 | 250 | 850 | 9.37 |
| Voranol 800 | Aliphatic-amine initiated polyol | The Dow Chemical Company | 800 | 4 | 281 | 17,310 | 11.82 |
| Pluracol 355 | amine-based tetrol | BASF Corporation North America | 450 | 4 | 500 | 2,700 | 11.63 |
| Pluracol PEP450 | Polyether tetrol, four secondary hydroxyl groups | BASF Corporation North America | 555 | 4 | 400 | 2,000 | 6.74 |
| Pluracol SG360 | sucrose/glycerine polyol | BASF Corporation North America | 368 | 4 | 610 | 3,500 | 9.93 |
| Poly G 71-530 | Sucrose amine polyol | Arch Chemicals, Inc. | 530 | 4.5 | 476 | 11,000 | 10.07 |
| Poly G 74-532 | sucrose-based polyol | Arch Chemicals, Inc. | 530 | 5.2 | 550 | 30,000 | 7.75 |
| Voractiv 6430 | catalytically active, high functionality capped polyol | The Dow Chemical Company | 32 | N/A | N/A | 10,000 | 11.57 |
| Desmophen NH1220 | linear seconadry aliphatic diamine | Bayer Material Science LLC | N/A | 2 | 458 | 150 | 8.41 |
| Desmophen NH1420 | cycloaliphatic secondary aliphatic diamine | Bayer Material Science LLC | N/A | 2 | 554 | 1,500 | 10.45 |

Prepolymer Preparation

The isocyanate prepolymer is prepared by mixing 203 g of Voranol 220-056N with 294 g of Voranol 232-036N. Mixing is carried out in a reactor by heating the mixture to 48° C. 90 g of Isonate 125M pure MDI and 0.5 g of stannous octoate are added to the mixture. The whole mixture is then reacted for 1 hour at 65° C. while stirring. Diisononyl phthalate plasticizer is added to the mixture such that the concentration of plasticizer is 33 percent (about 295 g) and the mixing is continued for 1 hour at temperature The isocyanate prepolymer has an isocyanate content of about 1.5 percent by weight, contains 33 percent of plasticizer and exhibits a viscosity of about 4,000 to about 12,000,000 centipoise.

Moisture Curable Adhesive Preparation

The moisture curable adhesive used in all of the Examples and Comparative Examples were prepared by combining the items in Table 3 as follows.

TABLE 3

| Item | Raw Material | 201300623-2A wt % |
|---|---|---|
| 1 | Polyether prepolymer | 59.30 |
| 2 | N100 | 1.00 |
| 3 | Palatinol N | 0.98 |
| 4 | Elftex S7100 | 19.00 |
| 5 | Drikalite | 19.00 |
| 6 | Dynacoll S1611 | 0.50 |
| 7 | DMDEE | 0.22 |
| | total | 100.00 |

A mixer is pre-heated to 100° C. and items 1-3 are added to the mixer and degassed under vacuum for 15 minutes. Items 4 and 5, after being predried, are added to the mixer and mixed for 5 minutes at slow speed under vacuum until they are sufficiently wetted by the other items. The speed of the mixer is slowly increased to disperse items 4 and 5 (fillers) for 20 minutes under full vacuum. Then item 6 is added and mixed for a further hour under vacuum. Finally, item 7 is added and mixed for an additional 15 minutes. The mixer is then cooled to ambient temperature and the moisture curable adhesive is discharged into a container under dry conditions.

Table 4 shows the cure accelerator Example and Comparative Examples. Each of these was made by essentially the same procedure as follows. Each of the items above Dabco 33LV (above the bold line) were first added to a mixer and degassed under vacuum for 15 minutes. The Elftex S7100 and Drikalite (pre-dried fillers) were then added and mixed slowly for 5 minutes under vacuum. The mixing speed was then increased and the fillers mixed for a further 15 minutes under vacuum. Finally, the catalysts (Fomrez UL-28 and Dabco 33LV) as shown were added and mixed under vacuum for 15 minutes. The mixture was then discharged into a sealed container.

Each of the cure accelerator formulations shown in Table 4 were placed into an adhesive dispensing system (two component sausage) with the above moisture curable adhesive as described in Example 1 of U.S. Application No. 61/977,668 described above. The volumetric ratio of the moisture curable adhesive to the cure accelerator was 9 to 1. For each Example and Comparative Example, the isocyanate index was essentially the same. The moisture curable adhesive and cure accelerator were dispensed in the same manner as described in Example 1 of the aforementioned US Application. The measured results are shown in Table 5 (Decking Force) and Table 6 (Cure Properties).

TABLE 4

| | Exp #1 wt % | Exp #2 wt % | Exp #3 wt % | Exp #4 wt % | Exp #5 wt % | Exp #6 wt % | Comp. Exp #1 wt % | Comp. Exp #2 wt % |
|---|---|---|---|---|---|---|---|---|
| Specflex NC700 | 54.00 | 45.00 | 48.00 | 48.00 | 26.50 | 26.50 | 50.00 | 50.00 |
| Palatinol N | 2.50 | 3.00 | 3.00 | 2.90 | 2.00 | 1.90 | 2.10 | 2.00 |
| Voranol 225 | | | | | 17 | 17 | | |
| Voranol 800 | 15.5 | | | | | | | |
| Pluracol 355 | | 24 | | | | | | |
| Pluracol PEP 450 | | | | | | | 19.4 | 19.4 |
| Pluracol SG360 | | | | | | | | |
| Poly G 71-530 | | | 21.00 | 21.00 | | | | |
| Poly G 74-532 | | | | | | | | |
| Voractiv 6340 | | | | | 26.50 | 26.50 | | |
| Desmophen NH1220 | | | | | | | | |
| Desmophen NH1420 | | | | | | | | |
| DABCO SSLV | 0.50 | 0.50 | 0.50 | 0.50 | 0.50 | 0.50 | 1.00 | 1.00 |

TABLE 4-continued

|  | | | | | | | | |
|---|---|---|---|---|---|---|---|---|
| Fomrez UL-28 |  |  |  |  | 0.10 |  | 0.10 |  | 0.10 |
| Elftex S7100 | 12.00 | 12.00 | 12.00 | 12.00 | 12.00 | 12.00 | 12.00 | 12.00 |
| Drikalite | 15.50 | 15.50 | 15.50 | 15.50 | 15.50 | 15.50 | 15.50 | 15.50 |
| total | 100 | 100 | 100 | 100 | 100 | 100 | 100 | 100 |

|  | Comp. Exp #3 wt % | Comp. Exp #4 wt % | Comp. Exp #5 wt % | Comp. Exp #6 wt % | Comp. Exp #7 wt % | Comp. Exp #8 wt % | Comp. Exp #9 wt % | Comp. Exp #10 wt % |
|---|---|---|---|---|---|---|---|---|
| Specflex NC700 | 40.50 | 40.50 | 48.00 | 48.00 | 51.00 | 51.00 | 50.00 | 50.00 |
| Palatinol N | 2.00 | 1.90 | 2.50 | 2.40 | 2.20 | 2.10 | 2.50 | 2.50 |
| Voranol 225 |  |  |  |  | 18.3 | 18.3 | 13 | 13 |
| Voranol 800 |  |  |  |  |  |  |  |  |
| Pluracol 355 |  |  |  |  |  |  |  |  |
| Pluracol PEP 450 |  |  |  |  |  |  |  |  |
| Pluracol SG360 | 29.00 | 29.00 |  |  |  |  |  |  |
| Poly G 71-530 |  |  |  |  |  |  |  |  |
| Poly G 74-532 |  |  | 21.00 | 21.00 |  |  |  |  |
| Voractiv 6340 |  |  |  |  |  |  |  |  |
| Desmophen NH1220 |  |  |  |  |  |  | 5.00 |  |
| Desmophen NH1420 |  |  |  |  |  |  |  | 5.00 |
| DABCO SSLV | 1.00 | 1.00 | 1.00 | 1.00 | 1.00 | 1.00 | 1.00 | 1.00 |
| Fomrez UL-28 |  | 0.10 |  | 0.10 |  | 0.10 |  |  |
| Elftex S7100 | 12.00 | 12.00 | 12.00 | 12.00 | 12.00 | 12.00 | 13.00 | 13.00 |
| Drikalite | 15.50 | 15.50 | 15.50 | 15.50 | 15.50 | 15.50 | 15.50 | 15.50 |
| total | 100 | 100 | 100 | 100 | 100 | 100 | 100 | 100 |

TABLE 5

| Decking force | −5 C. | | 25 C. | | 45 C. | |
|---|---|---|---|---|---|---|
| (lb) | 2 min | 8 min. | 2 min | 8 min. | 2 min | 8 min. |
| Exp #1 | 3.2 | 5.7 | 2.4 | 5.5 | 2.1 | 15.0 |
| Exp #2 | 2.1 | 3.8 | 1.8 | 3.4 | 1.5 | 3.8 |
| Exp #3 | N/A | N/A | 1.3 | 1.75 | N/A | N/A |
| Exp #4 | 2.9 | 5.6 | 3.8 | 15.5 | 4.3 | 78.5 |
| Exp #5 | N/A | N/A | 1.1 | 1.5 | N/A | N/A |
| Exp #6 | 2.8 | 4.5 | 2.1 | 5.2 | 2.7 | 21.4 |
| Comp. Exp #1 | N/A | N/A | 1.4 | 1.85 | N/A | N/A |
| Comp. Exp #2 | 2.5 | 8.1 | 2.9 | 14.0 | 4.3 | 109.9 |
| Comp. Exp #3 | N/A | N/A | 1.1 | 1.6 | N/A | N/A |
| Comp. Exp #4 | 3.1 | 5.3 | 3.1 | 12.2 | 3.8 | 93.3 |
| Comp. Exp #5 | N/A | N/A | 1.6 | 2.5 | N/A | N/A |
| Comp. Exp #6 | 2.3 | 6.8 | 2.2 | 3.5 | 2.2 | 9.5 |
| Comp. Exp #7 | N/A | N/A | 1.55 | 2.2 | N/A | N/A |
| Comp. Exp #8 | 2.4 | 4.6 | 4.6 | 10.5 | 4.2 | 40.7 |
| Comp. Exp #9 | 2.8 | 4.3 | 3.7 | 5.0 | 6.8 | 20.2 |
| Comp. Exp #10 | 5.1 | 12.2 | 3.1 | 10.3 | 4.0 | 9.8 |

TABLE 6

|  | Lap Shear Cure Rate Strength (psi) | | | Full Cure |
|---|---|---|---|---|
|  | 15 min. | 30 min. | 60 min. | Shore A Hardness |
| Exp #1 | 12.3 | 143.3 | 518.3 | 70 |
| Exp #2 | 5.7 | 29.7 | 88.7 | 66 |
| Exp #3 | 3.2 | 7.3 | 36.0 | N/A |
| Exp #4 | 23.7 | 64.0 | 126.7 | 66 |
| Exp #5 | 1.7 | 3.1 | 8.5 | N/A |
| Exp #6 | 19.0 | 99.7 | 273.7 | 62 |
| Comp. Exp #1 | 2.9 | 11.0 | 24.0 | N/A |
| Comp. Exp #2 | 10.7 | 22.7 | 48.0 | 54 |
| Comp. Exp #3 | 2.4 | 7.6 | 45.0 | N/A |
| Comp. Exp #4 | 88.0 | 318.3 | 274.7 | 72 |
| Comp. Exp #5 | 2.9 | 8.5 | 84.0 | N/A |
| Comp. Exp #6 | 3.4 | 7.7 | 174.0 | 71 |
| Comp. Exp #7 | 2.1 | 4.8 | 11.0 | N/A |
| Comp. Exp #8 | 8.2 | 12.1 | 32.0 | 57 |
| Comp. Exp #9 | 12.0 | 9.5 | 10.0 | 8 |
| Comp. Exp #10 | 14.0 | 10.0 | 15.0 | 53 |

From Table 5, it is readily apparent that the adhesive systems that have a cure accelerator that is comprised of the polyol having an amino group in the backbone are able to realize the combination of working time under typical ambient conditions as given by the decking force (particularly at −5° C. and 25° C.) while still achieving fast cure and Shore Hardness necessary to realize a durable well-bonded glass to a vehicle that may be driven away after 15 minutes. Even though it is possible to position the glass when the decking force is up to 15 pounds, it is much more desirable for the decking force to be less than 10 or even 8 pounds.

It is also desirable for the adhesive system to have an adequate cure at 15 minutes to allow for a vehicle to be driven away. Typically, the lap shear cure should be at least about 15 psi (pounds per square inch) but a too high number also is indicative of too fast cure such as above 50 psi. Alternatively, if the vehicle may be driven away in a slightly greater time than 15 minutes, it is generally adequate to have a lap shear of 25 psi to about 500 psi after 30 minutes of curing. The final cured properties are generally desired to be as follows: a lap shear of a least about 80 psi, 100, or even 500 to at most about 800 psi and a Shore A Hardness of at least about 60, 65 or even 68 to at most about 90.

From this, even though Comparative Examples 2 and 4 appear to have adequate workability at lower temperatures, they only achieve this with a high catalyst content to begin with when a very small further addition of catalyst is used compared to Comparative Examples 1 and 3. This small addition of catalyst causes inadequate cure at higher temperatures (this is also exemplified by the too high lap shear at strength after 15 minutes). That is Comparative Examples 3 and 4 show an extreme sensitivity of the cure rate and workability with small additions of catalyst. This makes them impractical to make a commercially viable product due to the consistency required from batch to batch and likely instability. As to the other Comparative Examples, it is readily apparent that to achieve the desired workability, the cure rate or Shore Hardness was inadequate or vice versa.

In contrast, Examples 1 and 2 show that the balance between workability and cure properties is readily achievable. Likewise, Examples 3 and 4 even though the adhesive system is not optimized, show that the desired workability and cure rate are achievable considering the reduced amount of Dabco 33LV catalyst versus Comparative Examples 3 and 4 as well as that adjustments of the catalyst would allow for the most desired decking force even at extremely high temperatures. Likewise, Examples 5 and 6 show that this cure accelerator may achieve the desired balance of workability and cure rate for the same reasons as given for Examples 3 and 4.

What is claimed is:

1. An adhesive system comprised of a moisture curable adhesive comprised of an isocyanate terminated prepolymer made using a diol and a triol, and a plasticizer, and a separate cure accelerator comprised of a first polyol having a backbone comprised of at least one amino group characterized by an apparent pH of at least 10 when measured in a solution of 10 g of the first polyol in 60 ml of a 10 wt % water solution in isopropyl alcohol, and an average OH functionality of at least 2 to 4.5 and present in an amount of 5% to 50% by weight of the cure accelerator; wherein the cure accelerator includes 20% to 80% by weight of the cure accelerator of a polyol not having an amino group, and the amount of any water in the cure accelerator is less than 1 weight percent, based on the total weight of the cure accelerator and the moisture curable adhesive:

wherein the adhesive system, upon curing, is substantially free of bubbles and has a Shore A hardness of at least 60, when measured according to ASTM D 2240-05;

wherein a volume ratio of the moisture curable adhesive to the cure accelerator is 5 to 200.

2. The adhesive system of claim 1, wherein the prepolymer is comprised of an isocyanate terminated polyether prepolymer, and the cure accelerator includes from 0 to 500 ppm water, based on the total weight of the cure accelerator and the moisture curable adhesive.

3. The adhesive system of claim 2, wherein the isocyanate terminated polyether prepolymer is comprised of a polyether backbone comprised of an ethylene oxide, a propylene oxide, or combination of these.

4. The adhesive system of claim 1, wherein the first polyol having an amino group has an OH # of at least about 250.

5. The adhesive system of claim 1, wherein said first polyol has an OH # of at least 550.

6. The adhesive system of claim 1, wherein the moisture curable adhesive is further comprised of at least one of the following a filler and a catalyst.

7. The adhesive system of claim 6, wherein the plasticizer is linear, branched or combination thereof.

8. The adhesive system of claim 1, wherein the first polyol has an average OH functionality of at least 3.5 to 4.2.

9. The adhesive system of claim 1, wherein the amino groups are all tertiary amines.

10. The adhesive system of claim 4, wherein the cure accelerator includes 10 to 35 percent of one or more fillers based on the weight of the cure accelerator.

11. The adhesive system of claim 10, wherein the cure accelerator includes from 0 to 500 ppm water, based on the total weight of the cure accelerator and the moisture curable adhesive.

12. The adhesive system of claim 11, wherein the cure accelerator includes 0.01% to 2% catalyst, based on the total weight of the cure accelerator.

13. An adhesive system comprised of a moisture curable adhesive comprised of an isocyanate terminated prepolymer made using a diol and a triol, and a plasticizer, and a separate cure accelerator comprised of a polyol having a backbone comprised of about 3.0 to about 6 amino groups and an average OH functionality of at least 2 to 4.5;

wherein the polyol having an amino group has an apparent pH of at least 10 when measured in a solution of 10 g of the first polyol in 60 ml of a 10 wt % water solution in isopropyl alcohol; wherein the cure accelerator includes 20% to 80% by weight of the cure accelerator of a polyol not having an amino group, and the amount of any water in the cure accelerator is sufficiently low so that bubbling is avoided upon curing the adhesive system;

wherein the adhesive system, upon curing, is substantially free of bubbles and has a Shore A hardness of at least 60, when measured according to ASTM D 2240-05.

14. The adhesive system of claim 13, wherein the moisture curable adhesive and cure accelerator are provided in a volumetric ratio of moisture curable adhesive/cure accelerator of 5 to 200.

15. The adhesive system of claim 14, wherein said volumetric ratio is 5 to 20.

16. The adhesive system of claim 13, wherein the apparent pH is at least 11.

* * * * *